United States Patent
Perry et al.

(10) Patent No.: US 9,375,029 B2
(45) Date of Patent: Jun. 28, 2016

(54) FOOD SUPPLEMENT

(75) Inventors: Carole Celia Perry, Lenton (GB); David John Belton, Mapperley (GB)

(73) Assignee: THE NOTTINGHAM TRENT UNIVERSITY, Nottingham (GB)

( * ) Notice: Subject to any disclaimer, the term of this patent is extended or adjusted under 35 U.S.C. 154(b) by 88 days.

(21) Appl. No.: 12/736,194

(22) PCT Filed: Mar. 20, 2009

(86) PCT No.: PCT/GB2009/000768
§ 371 (c)(1),
(2), (4) Date: Nov. 26, 2010

(87) PCT Pub. No.: WO2009/115827
PCT Pub. Date: Sep. 24, 2009

(65) Prior Publication Data
US 2011/0070351 A1 Mar. 24, 2011

(30) Foreign Application Priority Data

Mar. 20, 2008 (GB) .................................. 0805279.7

(51) Int. Cl.
A61K 31/70 (2006.01)
A23L 1/304 (2006.01)
A23K 1/16 (2006.01)
A23K 1/175 (2006.01)
A23K 1/18 (2006.01)
A23L 1/30 (2006.01)
A23L 2/52 (2006.01)

(52) U.S. Cl.
CPC ................ *A23L 1/304* (2013.01); *A23K 1/164* (2013.01); *A23K 1/1609* (2013.01); *A23K 1/1756* (2013.01); *A23K 1/1826* (2013.01); *A23L 1/30* (2013.01); *A23L 2/52* (2013.01)

(58) Field of Classification Search
CPC ... A23K 1/1609; A23K 1/164; A23K 1/1756; A23K 1/1826; A23L 1/30; A23L 1/304; A23L 2/52
See application file for complete search history.

(56) References Cited

U.S. PATENT DOCUMENTS

| 3,655,578 | A | * | 4/1972 | Yates ............................. 516/83 |
| 4,376,757 | A | * | 3/1983 | Hinnenkamp et al. ........ 423/702 |
| 4,810,496 | A | | 3/1989 | Jensen |
| 4,948,589 | A | | 8/1990 | Iijima et al. |
| 5,190,775 | A | | 3/1993 | Klose |

(Continued)

FOREIGN PATENT DOCUMENTS

| DE | 202 20 180 U1 | 5/2003 |
| EP | 0 497 286 A1 | 8/1992 |

(Continued)

OTHER PUBLICATIONS

Kaye, Brain H. A Random Walk Through Fractal Dimensions, 2nd Edition, Wiley, 1994, pp. 104.*

(Continued)

*Primary Examiner* — Michele L Jacobson
*Assistant Examiner* — Hong T Yoo
(74) *Attorney, Agent, or Firm* — Cantor Colburn LLP

(57) ABSTRACT

The invention relates to food supplements comprising silica a quaternary ammonium compound or a group Ia hydroxide and an organic acid, and to those comprising a group Ia silicon salt and an organic acid, to methods of making such supplements and to foods containing them.

26 Claims, 3 Drawing Sheets

(56) References Cited

U.S. PATENT DOCUMENTS

Figure 1:
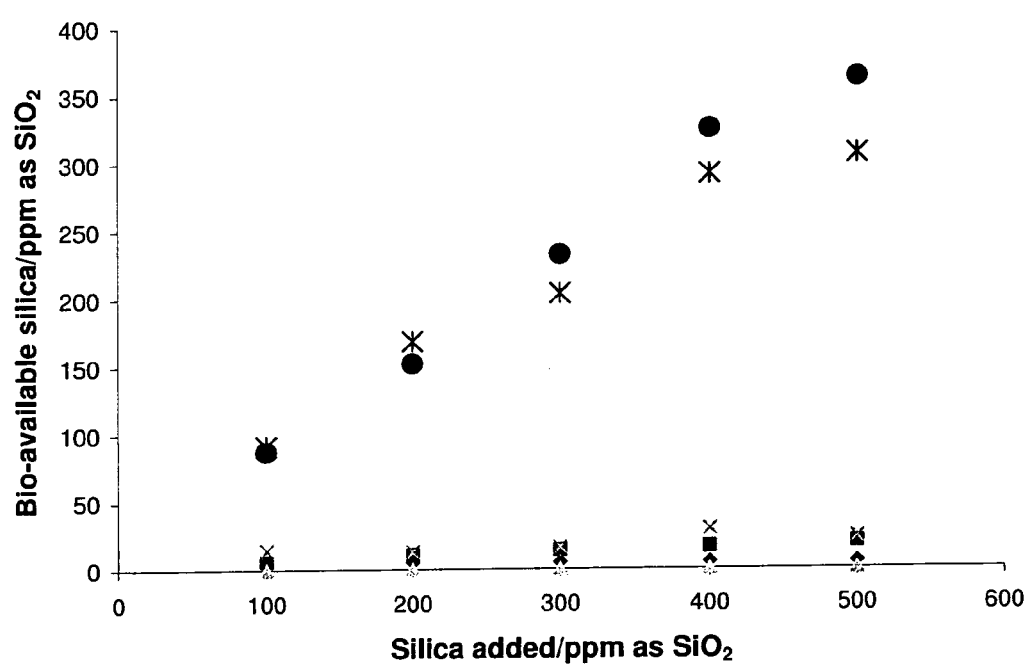

| | | | |
|---|---|---|---|
| 5,534,509 | A | 7/1996 | Konishi et al. |
| 5,707,970 | A | 1/1998 | McCarty et al. |
| 2003/0099676 | A1* | 5/2003 | Van Den Berghe ........... 424/401 |
| 2003/0190374 | A1 | 10/2003 | Howard |
| 2006/0178268 | A1 | 8/2006 | Kros |
| 2007/0098807 | A1 | 5/2007 | Babich et al. |

FOREIGN PATENT DOCUMENTS

| | | |
|---|---|---|
| EP | 1 391 426 A1 | 2/2004 |
| FR | 2 704 393 A1 | 11/1994 |
| WO | WO 95/21124 A1 | 8/1995 |
| WO | WO 96/08168 A1 | 3/1996 |
| WO | WO 01/47907 A1 | 7/2001 |
| WO | WO 03/061640 A1 | 7/2003 |
| WO | WO 03/077657 A1 | 9/2003 |
| WO | WO 2004/016551 A1 | 2/2004 |
| WO | WO 2006/136003 A1 | 12/2006 |
| WO | WO 2008/016701 A2 | 2/2008 |
| WO | WO 2009/127256 A1 | 10/2009 |
| WO | WO 2010/012507 A1 | 2/2010 |
| WO | WO 2010/018418 A1 | 2/2010 |

OTHER PUBLICATIONS

Mineral Resources of the United States, Part. 2, 1918, pp. 436 http://books.google.com/books?id=TbTPAAAAMAAJ&pg=PA436&dq=potassium+and+silicate+obtained+from+potassium+hydroxide,+pg.+436mineral +resources&hl=en&sa=X&ved=0ahUKEwifzmV_eXLAhVCPiYKHergB04Q6AEIHjAA#v=onepage&q=potassium%20and%20silicate%20obtained%20from%20potassium%20hydroxide%2C%20pg.%20436mineral%20resources&f=false.*

Smirnova, S. N. et al., "*Food Additive*", Abstract, Database WPI Week 200016 Thompson Scientific, London, GB; AN 2000-180788, XP00234593 (Dec. 1998).

Elliot, Michael A. and Edwards, Hardy M., Jr., "*Effect of Dietary Silicon on Growth and Skeletal Development in Chickens*", The Journal of Nutrition, pp. 201-207 (Aug. 1990).

Carlisle, E. M., "*Silicon: An Essential Element for the Chick*", Science, vol. 178, No. 4061, pp. 619-621 (Nov. 1972. [Abstract].

Carlisle, E. M., "*A Silicon Requirement for Normal Skull Formation in Chicks*", The Journal of Nutrition, vol. 110, pp. 352-359 (1980).

Schwarz, K. and Milne, D. B., "*Growth-promoting Effects of Silicon in Rats*", Nature, vol. 239, pp. 333-334 (Jun. 1972).

Carlisle, E. M. and Alpenfels, W. F., "*The Role of Silicon in Proline Synthesis*", Federation Proceedings, vol. 43, p. 680 (1984).

Carlisle, E. M. et al., "*A Silicon Requirement for Prolyl Hydroxylase Activity*", Federation Proceedings, vol. 40, p. 886 (1981).

Charnot, Y. and Pérès, G., "*Contribution a l'étude de la régulation endocrinieene du métabolism silicique*", Société D'Endocrinolgie, vol. 32, pp. 397-402 (1971).

Jugdaohsingh, R. et al., "*Dietary Silicon Intake Is Positively Associated With Bone Mineral Density in Men and Premenopausal Women of the Framingham Offspring Cohort*": Journal of Bone and Mineral Research, vol. 19, No. 2, pp. 297-307 (2004).

Reffit, D. M. et al., "*Orthosilicic acid stimulates collagen type 1 synthesis and osteoblastic differentiation in human osteoblast-like cells in vitro*", Bone, vol. 32, pp. 127-135 (2003).

Barel, A. et al., "*Effect of oral intake of choline-stabilized orthosilicic acid on skin, nails and hair in women with photodamaged skin*", Archives of Dermatological Research, vol. 297, No. 4, pp. 147-153 (Oct. 2005).

Khamova, T. V. et al., "*Investigation of the Structuring in the Sol-Gel Systems Based on Tetraethoxysilane*", Glass Physics and Chemistry, vol. 32, No. 4, pp. 448-459 (2006).

\* cited by examiner

FOOD SUPPLEMENT

CROSS-REFERENCE TO RELATED APPLICATIONS

This application is a U.S. National Stage Application of International Patent Application PCT/GB2009/00768 filed Mar. 20, 2009.

The invention relates to food supplements comprising silica a quaternary ammonium compound or a group Ia hydroxide and an organic acid, and to those comprising a group Ia silicon salt and an organic acid, to methods of making such supplements and to foods containing them.

BACKGROUND

In spite of silicon being the second most abundant element in nature bound as silicates in rocks and found solubilised as monomeric silicic acid in fresh and sea water it has not always been regarded as an essential nutrient in animal species.

Work conducted in the late 70's involving the removal of silicon from the diet of chickens and rats[1,2] showed its role in the formation of bone density and connective tissues and follow up studies showed that collagen formation may be enhanced by the formation of proline and hydroxyproline in the presence of silicon[3,4]. Furthermore silicon has been found to be reduced in the serum of post menopausal women a group in which loss of bone density is common[5]. Silicon is thought to be essential in the diet but the precise mechanism by which it acts is uncertain and to date no metabolic processes involving silicon in animal species have been identified. However, it has been suggested that silicon aids the formation of glycosaminoglycan and collagen components of the bone matrix through its role as a constituent of the enzyme prolylhydrolase. Alternatively, silicon could have a structural role as a component of glycosaminoglycans and glycosamino-protein complexes, occurring as silanolate in mucopolysaccharides and linking different polysaccharides in the same polysaccharide chain, or linking acid mucopolysaccharides to protein. A number of recent studies have reinforced the suggestion that silicon is important in bone and connective tissue production. One involving a large study of over 2800 patients showed a significant link between the intake of silicon and bone mineral density[6]. A second study of cell lines in vitro showed orthosilicic acid to increase the formation of type 1 collagen, a component of connective tissue and bone[7], and an improvement of sun damaged skin, hair and nail conditions when choline stabilised silicon was added to the diet in a double blind placebo study[8].

Additionally silicon supplements have been shown to be beneficial in the training of horses where significant injury reduction has been achieved and in the raising of commercial animal stocks where silicon supplements (usually in the form of zeolites) are routinely administered. Recommendations on adequate nutritional intakes have not been established, either by COMA (Committee on Medical Aspects of Food and Nutrition Policy) or other advisory bodies however silicon deficiency has not been observed in humans. Dietary silicon intake is largely of plant origin including high levels particularly in grains such as oats, barley or rice, but this is essentially non bio-available due to the low solubility of silicon in water. Levels are lower in foods from animal sources. Silicon is also found in drinking water as orthosilicic acid which is its bioactive, assimilable form, and this is the source of most bio-available dietary silica with a 2 L consumption of water estimated to provide up to 10 mg of silicon in the form of monosilicic acid.

UK food supplements contain up to 500 mg silicon, but this is usually in the form of silica gels/sols, pulverised quartz or silica derived from plant material none of which are readily bioavailable.

Stabilised soluble silicon solutions have been described with quaternary ammonium compounds and these have been shown to provide high levels of bio-available silicon. However due to the nature of these complexes the liquid feed is supplied as a very caustic solution and potential for dosing errors and accidents in usage exist. Moreover, alternative sources of silica, such as potassium silicate are also caustic.

The inventors have shown that it is possible to recover the bioavailability from solids freeze dried from such stabilised caustic solutions and additionally recover the bioavailability of the same solids after mixing with organic acids (e.g. naturally occurring citric and tartaric acids) providing an internally compensated pH neutral product. Additionally the silicon source can be biogenic (from plant species such as rice or *equisetum* or possible diatomaceous origin). Silica from such species has a relatively high surface area and is found to dissolve rapidly in the stabilising medium. Typically, hydrolysed silicon tetrachloride which reacts violently with water, is irritating to eyes, respiratory system and skin, is used as the silicon source for quaternary ammonium stabilised silicon salts and hence the preferred use of biogenic silica is therefore an improvement on environmental and cost grounds.

A first aspect of the invention provides:
a food supplement comprising:
i) silica;
ii) a quaternary ammonium compound and/or a group Ia hydroxide
iii) an organic acid.

The inventors have found that combining the silica with at least one of a quaternary ammonium compound or group Ia hydroxide (e.g. sodium hydroxide or potassium hydroxide), together with the organic acid provides a source of bioavailable silica at a predictable dosage; allows the pH of the supplement if dissolved to be controlled, for example to a substantially neutral pH; and allows the dosage to be easily controlled by allowing the production of a solid product.

The inventors have also found that silicon salts, such as sodium silicate or potassium silicate (or sodium metasilicate or potassium metasilicate), may also be advantageously buffered with organic acids. This has the advantage of being able to be produced from readily available silicon salts, whilst still having enhanced bioavailablity and still being user friendly. Accordingly a further second aspect of the invention provides:

A food supplement comprising :
i) a Group Ia silicon salt; and
ii) an organic acid.

Preferably the Group Ia silicon salt is sodium silicate or potassium silicate. Typically the molar ratio of $Na_2SiO_3$: carboxylate groups on the organic acid is 1:2.

The nature of the product means that the final composition is preferably substantially non-toxic at the concentrations it is finally administered at which is intended to be around 200-1000 ppm as $Si(OH)_4$.

Typically 60-80% of the silicon added to these solutions remains bio-active as determined by a modified colorimetric method described by R K Iler (R. K. Iler, The Chemistry of Silica, John Wiley & Sons, N.Y., 1979) which involves the formation of a complex between silicon and molybdenum and which is only sensitive to monosilicic acid or species which dissociate to monosilicic acid in the time frame of the experiment.

The quarternary ammonium salt and/or group Ia hydroxide, may be replaced by another basic salt which can prevent condensation of silanol groups by counter-ion stablisation of soluble anionic siloxy groups.

The term substantially neutral pH means a pH of between 6.0 and 8.0, more preferably between 6.5 and 7.5, more typically approximately pH 7.0.

Preferably, the silica solubilising agent is a tetraalkylammonium hydroxide, or sodium or potassium hydroxide.

Preferably the tetraalkylammonium hydroxide is tetraethyl, tetramethyl, tetrapropyl tetrabutyl or a combination thereof (to form a mixed alkylammonium hydroxide such as diethyldimethyl ammonium hydroxide, where alkyl is C1—C4), but can be one of a number of naturally occurring quaternary ammonium compounds including carnitine, cholines and betaines.

The silica preferably has a surface area of at least 10 $m^2/g$. However, having a larger surface area improves the solubility when mixed with the solubilising agent. The surface area may be at least 25, at least 50 or at least 100 $m^2/g$ Potentially almost any source of silica or silicate can be used, including commercially produced silica from non-biological sources including fumed silica, silica gel and pulverised minerals. However, preferably the silica is biogenic silica derived from biological sources. This includes, for example diatomaceous earth, diatoms and silicified plant material More preferably the biogenic silica is derived from multicellular plant material, such as from rice husks or *Equisetum* also known by the common name "horsetail". Such biogenic silica is readily available from commercial sources.

Preferably the organic acid used according to any aspect of the invention is a C1—C6 (more preferably a C4, C5 or C6) carboxylic acid. It may be a straight chain or branched chain organic acid. It may comprise one or more hydroxyl groups however other chain lengths and levels of hydroxylation including the absence of hydroxyl groups can be used. The organic acid may be a naturally occurring organic acid such as ascorbic acid, citric acid or tartaric acid. The organic acid is typically an edible organic acid Preferably wherein the molar ratio of silica to ammonium cation or group Ia cation is in the range of 1:1 up to 1:2, and may be 1:1.

The food supplement according to the invention may additionally comprise a liquid dispersant for example an oil, such as an edible oil. These include oils such as a vegetable oil, glycerol or paraffin. The term "vegetable oil" includes rape seed oil and olive oil. This may be admixed with the ingredients.

The paraffin is typically an edible, food grade of paraffin.

For example the silicate and organic acid may be mixed with oil prior to adding to the rest of the feed components, for example by wet mixing or spraying. Typically 5% w/w oil: feed mix is used.

The food supplement according to any preceding claim may be dried, in a substantially water free paste or in suspension. It may be pelleted for easier mixing with, for example a food stuff, it may also be dispersed in a water free liquid medium.

It may also be provided in drinking water.

The food supplement may also comprise one or more of the following: salt and/or carboxylate excipients, clay and/or talc or other bulking agents, sugars such as glucose, commercially available mineral premixes, soya meal, flavourings or liquid dispersant.

A further aspect of the invention also provides:

A method of producing a food supplement comprising:
a) mixing silica with a quaternary ammonium compound or a salt thereof in a solvent (for example water);
b) removing the solvent to form a solid; and
c) mixing an organic acid with the solid to form a food supplement.

Preferably sufficient organic acid is added to the solid so that when the mixture is dissolved in water, a substantially pH neutral solution is produced.

The invention also provides:

a method of producing a food supplement comprising mixing:
i) a Group Ia silicon salt; and
ii) an organic acid.

The food supplement preferably comprises one or more components as defined above for the first or second aspect of the invention.

The food supplement may be mixed with feed on manufacture of the feed. Alternatively it may be added substantially immediately prior to feeding to animals or humans or provided in the drinking water. In the latter case it may be added substantially immediately before providing the drinking water to the animal or human.

The invention also provides a food supplement obtainable by a method according to the invention.

Animal feed or human food comprising a food supplement according to the invention are also provided.

A method of providing dietary silica comprising providing a food supplement, animal feed, or human food according to the invention are still further provided.

The invention will now be described by way of example only.

FIG. 1. Bio-availability comparison of citric acid pH neutralised KOH and TMAOH formulations with some other proprietary brands (♦ Cell food silica formula-Colloidal silica, ■ Biosil-Choline stabilised, ▲ Silicea-Colloidal silica, X Stinging nettle-leaf extract, * Neutral formula I KOH, ● Neutral formula I TMAOH).

Figure 2:
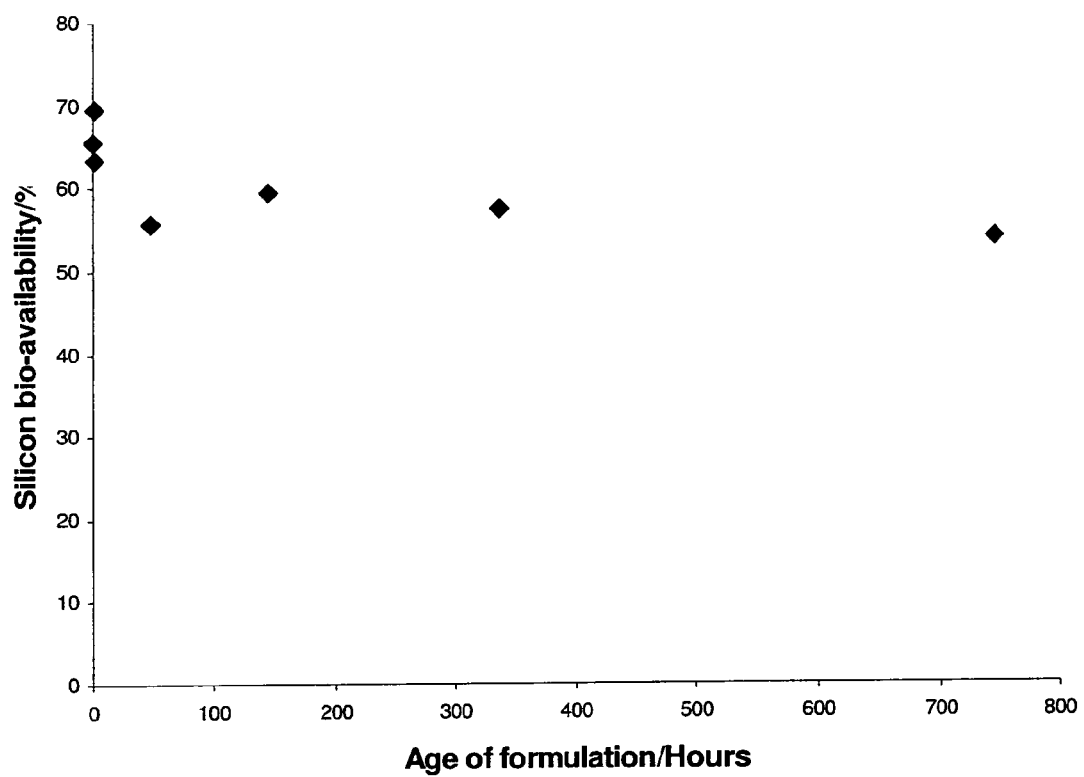

FIG. 2. Stability of typical formulation mix.

Figure 3:
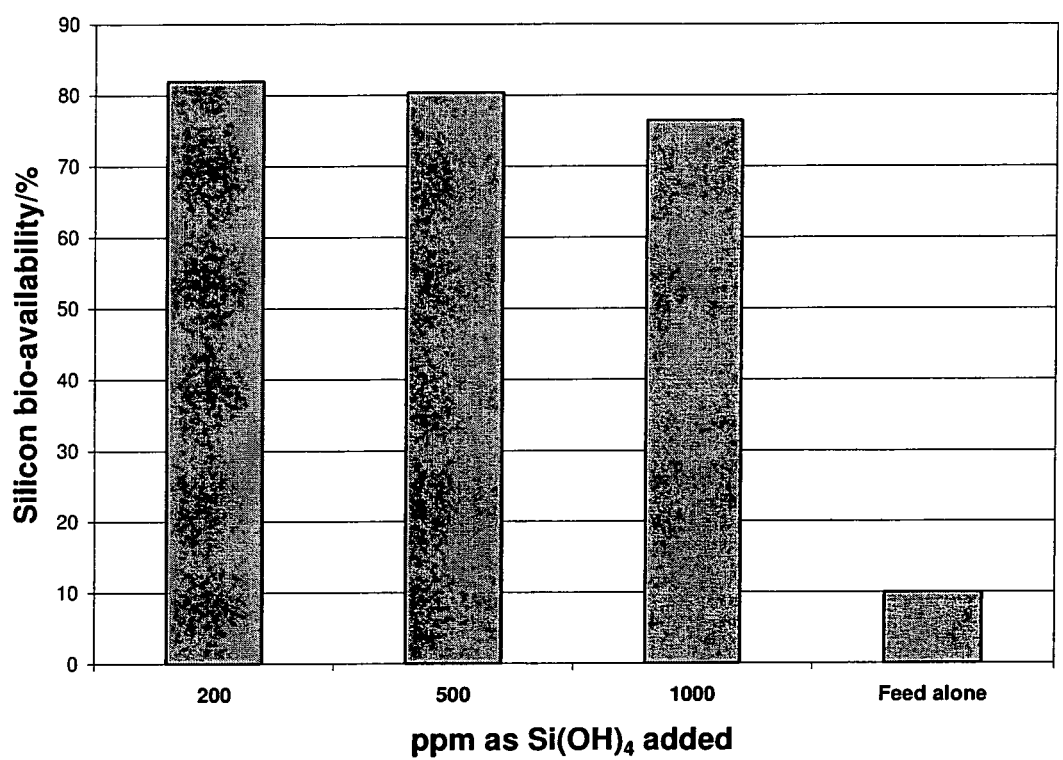

FIG. 3. Total and bio-available silicon in enhanced formulation and chicken feed made according to the invention

EXAMPLE PREPARATION (Biogenic) silica (1 g) is added to a solution of tetramethylammonium hydroxide (TMA OH) (or other quaternary ammonium species including naturally occurring species or group Ia hydroxide, such as KOH) containing a molar equivalent of hydroxide to silicon in water (20 $cm^3$). The mixture is heated to 40° C. for 1 hour until any residual cloudiness has disappeared. The solution is then chilled in liquid nitrogen and freeze dried. The solid is then loosely ground and mixed with sufficient naturally occurring organic acid (such as citric acid or tartaric acid) such that re-dissolution in water will produce a pH neutral solution. The silicon bioavailability has been found to be as high as 80% when solutions of 500 ppm or less are prepared and at the proposed final use dilution strength of 200 ppm the solution remains stable for over 48 hours. Comparison of formulation bio-availability with proprietary formulations FIG. 1.

Silicea (Anthon Hubner GmbH +Co) and cell food formula (NuScience Corporation, Calif., US) are colloidal silicas with relatively large particle sizes, Bio-sil (Bio Minerals N.V, Belgium) is an acidic choline chloride stabilised colloidal silica with smaller particle sizes and the stinging nettle leaf extract (Enzymatic Therapy Inc, Green Bay, Wis., US) is dried powdered nettle leaf which is known to contain silica. All were added to water to give the same level of silica according to the amounts listed on the labels and compared to our neutral potassium and tetramethylammonium hydroxide based formulae.

Additives can also be made by mixing
i) a Group Ia silicon salt; and
ii) an organic acid.

Typically the Group Ia silicon salt is sodium silicate or potassium silicate in a molar ratio of $Na_2SiO_3$:carboxylate groups on the organic acid is 1:2. Citric acid or tartaric acid is added to make a pH neutral solution. This has the advantage of being able to use readily available components.

FIG. 2 shows the 1 month stability of a sodium metasilicate/citric acid formula. It is expected that the salts and the solubilised silicas have similar bio-availability and storage properties.

Chicken Feed Example:

Soya meal (20 g), glucose (13.8 g), starch (13.8 g) and a mineral pre-mix (2.5 g) were mixed thoroughly until of uniform appearance. 66.8 mg of a formulation prepared as above using sodium hydroxide as the solubilising agent and citric acid monohydrate as the neutralising agent was then added to soya oil (2.5 g) and further ground to obtain a suspension. This was then added to the dry mix and stirred until the oil had been evenly distributed on to the powdered ingredients. Analysis of the final feed which contained 500 ppm equivalent of monosilicic acid for silicon bio-activity showed 80% of the silicon added to be in the bio-available form. A corresponding analysis of the feed materials without the added formulation showed low silicon bio-availability based on water soluble silica against total hydroxide digested silica.

The bioavailablity of silicon in chicken feed is shown in FIG. 3

REFERENCES

1) Carlisle E M. "Silicon: An essential element for the chick." Science, 1972; 178:619-621.
2) Schwarz K and Miline D B. "Growth-promotion effects of silicon in rats." Nature, 1972; 239:333-334.
3) Carlisle E M and Alpenfels W F. "The role of silicon in proline synthesis." Fed Proc, 1984; 43:680.
4) Carlisle E M, Berger J W, and Alpenfels W F. "A silicon requirement for prolyl hydroxylase activity." Fed Proc, 1981; 40:886.
5) Charnot Y and Peres G. "Contribution a l'etude de la regulation endocrinienne du metabolisme silicique." Ann Endocrinol, 1971; 32:397-402.
6) Jugdaohsingh R, Tucker K L, Kiel D P, Qiao N, Powell J J. Silicon uptake is a major dietary determinant of bone mineral density (BMD) in men and pre-menopausal women of the Framingham Offspring Cohort. Bone 2003 May;32,: S192
7) Reffitt D M, Ogston N, Jugdaohsingh R, Cheung H F, Evans B A, Thompson R P, Powell J J, Hampson G N. Orthosilicic acid stimulates collagen type 1 synthesis and osteoblastic differentiation in human osteoblast-like cells in vitro. Bone. 2003 Feb;32(2): 127-35.
8) A. Barel, M. Calomme , A. Timchenko, K. De. Paepe, N. Demeester, V. Rogiers, P. Clarys and D. Vanden Berghe Effect of oral intake of choline-stabilized orthosilicic acid on skin, nails and hair in women with photodamaged skin Archives of Dermatological Research Volume 297, Number 4/October, 2005 147-153

The invention claimed is:

1. A method of producing a food supplement comprising the steps of:
   (a) mixing silica with a quaternary ammonium compound or group Ia hydroxide in a solvent to obtain a mixture, wherein the molar ratio of silica to ammonium cation or group Ia cation is in the range 1:1-1:2;
   (b) heating the mixture for 1 hour at 40° C.;
   (c) removing the solvent from the mixture to form a solid;
   (d) mixing an organic acid with the solid to form a food supplement; and
   (e) mixing the food supplement with a liquid dispersant; wherein the food supplement has a pH in the range of 6.0 to 8.0.

2. The method according to claim 1, wherein the quaternary ammonium compound is a tetraalkylammonium hydroxide or the group Ia hydroxide is sodium or potassium hydroxide.

3. The method according to claim 1, wherein the quaternary ammonium compound is selected from the group consisting of tetraethylammonium hydroxide, tetramethylammonium hydroxide, tetrapropylammonium hydroxide, tetrabutylammonium hydroxide, a mixed alkylammonium hydroxide, cholines and mixtures thereof.

4. The method according to claim 1, wherein the silica has a surface area of at least 10 $m^2$/g.

5. The method according to claim 1, wherein the silica is biogenic silica.

6. The method according to claim 5, wherein the biogenic silica is obtainable from rice husks or *Equisetum*.

7. The method according to claim 1, wherein the organic acid is a $C_1$-$C_6$ carboxylic acid.

8. The method according to claim 7, wherein the organic acid comprises one or more hydroxyl groups.

9. The method according to claim 7, wherein the organic acid is ascorbic, citric acid or tartaric acid.

10. The method according to claim 1, wherein the liquid dispersant is an oil.

11. The method according to claim 10, wherein the oil is selected from a vegetable oil, glycerol or food grade paraffin.

12. The method according to claim 1, wherein the food supplement is dried, made into a substantially water free paste or made into a suspension.

13. A food supplement made by the method of claim 1.

14. An animal feed or drink or human food or drink comprising a food supplement according to claim 13.

15. A method of providing dietary silica comprising providing a food supplement, animal feed or drink, or human food or drink according to claim 13.

16. The method according to claim 1, wherein the molar ratio of silica to ammonium cation or group Ia cation is 1:1.

17. The method of claim 1, wherein the organic acid is a C1-C6 carboxylic acid and a molar ratio of silica:carboxylate group on the C1-C6 carboxylic acid is 1:2.

18. The method of claim 1, wherein removing the solvent from the mixture to form a solid comprises
   freeze-drying the mixture to form a solid.

19. A food supplement comprising:
   (i) silica;
   (ii) a solubilising agent which selected from the group consisting of quaternary ammonium compound and a group Ia hydroxide, wherein the molar ratio of silica to ammonium cation or group Ia cation is in the range 1:1-1:2;

(iii) an organic acid, wherein the organic acid is a C1-C6 carboxylic acid and a molar ratio of silica:carboxylate group on the C1-C6 carboxylic acid is 1:2; and
(iv) an oil
and having a pH in the range of 6.0 and 8.0.

20. A food supplement according to claim 19, wherein the oil is selected from a vegetable oil, glycerol or food grade paraffin.

21. An animal feed or drink or human food or drink comprising a food supplement according to claim 19.

22. A method of providing dietary silica comprising providing a food supplement, animal feed or drink, or human food or drink according to claim 19.

23. A food supplement consisting essentially of:
   (i) a Group Ia silicon salt wherein the molar ratio of silica to group Ia cation is in the range 1:1-1:2;
   (ii) an organic acid, wherein the organic acid is a C1-C6 carboxylic acid and a molar ratio of silica:carboxylate group on the C1-C6 carboxylic acid is 1:2; and
   (iii) an oil; and having a pH in the range of 6.0 and 8.0.

24. A food supplement according to claim 23, wherein the oil is selected from vegetable oil, glycerol or food grade paraffin.

25. An animal feed or drink or human food or drink comprising a food supplement according to claim 23.

26. A method of providing dietary silica comprising providing a food supplement, animal feed or drink, or human food or drink according to claim 23.

* * * * *